(12) United States Patent
Domic Mihovilovic et al.

(10) Patent No.: US 12,378,635 B2
(45) Date of Patent: Aug. 5, 2025

(54) SOLID-LIQUID-SOLID HYDROMETALLURGICAL PROCESS OPTIMIZED TO INCREASE THE SOLUBILIZATION OF METALS FROM ORES AND/OR CONCENTRATES IN ACID-CHLORIDE MEDIUM

(71) Applicant: NOVA MINERALIS S.A., Santiago (CL)

(72) Inventors: Tihomir Domic Mihovilovic, Santiago (CL); Esteban Domic Mihovilovic, Santiago (CL); Rodrigo Andrés Cortés Cortés, Santiago (CL)

(73) Assignee: NOVA MINERALIS S.A., Santiago (CL)

( * ) Notice: Subject to any disclaimer, the term of this patent is extended or adjusted under 35 U.S.C. 154(b) by 546 days.

(21) Appl. No.: 17/772,470

(22) PCT Filed: Oct. 1, 2020

(86) PCT No.: PCT/CL2020/050110
§ 371 (c)(1),
(2) Date: Apr. 27, 2022

(87) PCT Pub. No.: WO2021/081679
PCT Pub. Date: May 6, 2021

(65) Prior Publication Data
US 2022/0356544 A1    Nov. 10, 2022

(30) Foreign Application Priority Data
Oct. 29, 2019 (WO) ................. PCT/IB2019/059258

(51) Int. Cl.
*C22B 15/00* (2006.01)
*C22B 3/08* (2006.01)
*C22B 3/10* (2006.01)

(52) U.S. Cl.
CPC ............ *C22B 15/0069* (2013.01); *C22B 3/08* (2013.01); *C22B 3/10* (2013.01); *C22B 15/0071* (2013.01)

(58) Field of Classification Search
CPC ......... C22B 15/0069; C22B 3/08; C22B 3/10; C22B 15/0071
USPC ........................................................ 75/743
See application file for complete search history.

(56) References Cited

U.S. PATENT DOCUMENTS 10,041,143 B2 * 8/2018 Rautenbach ........ C22B 15/0071

FOREIGN PATENT DOCUMENTS

CA          3096242 A1 * 10/2019 ............... C22B 1/14

* cited by examiner

*Primary Examiner* — Danielle M. Carda
(74) *Attorney, Agent, or Firm* — Morgan, Lewis & Bockius LLP

(57) ABSTRACT

The present invention describes a Solid-Liquid-Solid hydrometallurgical process, optimized and independent of redox potential, to increase the solubilization of metals from ores and/or concentrates with a granulometry of less than 40 mm, by means of an initial stage called "Activation"; a second stage called "Dry autocatalytic transformation"; a third stage called "Washing and re-wetting"; and where the stages of dry autocatalytic transformation and washing and re-wetting, can be repeated in an alternating and repeated way.

18 Claims, 6 Drawing Sheets

| Copper Content by Mineralogical Species (%) | | | | | | | |
|---|---|---|---|---|---|---|---|
| Mineralogical analysis | M-1 | M-2 | M-3 | M-4 | M-5 | M-6 | Concentrate 1 |
| Chalcopyrite | 53,4 | 98,7 | 65,9 | 40,7 | 42,9 | 11,7 | 73,0 |
| Enargite | 0,7 | 0,2 | 14,8 | 0,4 | 7,9 | 0,1 | |
| Bornite | 32,7 | 0,6 | 11,4 | 58,4 | 12,0 | 12,0 | 17,0 |
| Covellite | 0,6 | | | | | | |
| Chalcocite | 12,6 | 0,5 | 7,9 | 0,5 | 37,2 | 76,2 | 10,0 |
| Total | 100,0 | 100,0 | 100,0 | 100,0 | 100,0 | 100,0 | 100,0 |
| Sequential Copper Chemical Analysis (%) | | | | | | | |
| Ahemical analysis | M-1 | M-2 | M-3 | M-4 | M-5 | M-6 | Concentrate 1 |
| $CuS_{H+}$ | 0,06 | 0,01 | 0,01 | 0,02 | 0,08 | 0,05 | 4,1 |
| $CuS_{CN-}$ | 0,32 | 0,09 | 0,08 | 0,40 | 0,29 | 0,46 | 6,8 |
| $Cu_{Insol}$ | 0,34 | 0,51 | 0,35 | 0,27 | 0,21 | 0,13 | 22,7 |
| Total | 0,72 | 0,61 | 0,44 | 0,69 | 0,57 | 0,64 | 33,6 |

FIG. 1

SOLID-LIQUID-SOLID HYDROMETALLURGICAL PROCESS OPTIMIZED TO INCREASE THE SOLUBILIZATION OF METALS FROM ORES AND/OR CONCENTRATES IN ACID-CHLORIDE MEDIUM

FIELD OF INVENTION

The present invention is related to the mining industry. In particular, the present invention refers to a Solid-Liquid-Solid hydrometallurgical procedure, optimized and independent of redox potential, to increase the solubilization of metals of interest from ores and concentrates.

BACKGROUND INFORMATION

The solubilization of metals such as copper, zinc, nickel, molybdenum, cobalt and lead from ores and/or concentrates using hydrometallurgical processes remains a significant challenge in the mining industry. Among other reasons, this is because leaching procedures through which different metals of interest are solubilized from minerals and/or concentrates must face multiple technical problems, the reconciliation of which is complex.

For example, it is desirable to have leaching procedures that use as little energy, reagents and other materials as possible, but still increase the percentage of solubilization of the metal of interest, all in the shortest possible time. In this context, the challenge lies in the fact that many of these objectives are contradictory to each other, so it is necessary to identify an optimal balance that allows making the leaching procedure as efficient as possible. For example, to increase the percentage of solubilization of the metal of interest, longer reaction time and/or the use of more reagents and/or energy is usually required. Therefore, to speed up the leaching procedure, it would be necessary to use more reagents and/or energy, which would increase the costs of the procedure, making it less efficient.

Similarly, it has been described that the finer the ore, that is, the smaller the granulometry of the ore, the higher the solubilization expectations of the metal of interest. However, this requires several crushing processes, which implies the use of a great amount of energy, so it is desirable to have leaching procedures that optimize such processes and allow the leaching procedures to work properly at coarser granulometries.

Concerning copper, it is essential to bear in mind that the challenges are especially relevant about the solubilization of this metal from minerals in the form of chalcopyrite. On the one hand, and as it is well known, chalcopyrite is a highly refractory mineral, so some of the leaching agents do not allow its solubilization easily. On the other hand, the challenge has become especially relevant as chalcopyrite ores represent one of the largest sources of copper available today.

In this context, although a series of leaching procedures have been developed to improve the solubilization of minerals and/or concentrates in terms of increasing the percentage of solubilization of the metals contained in them, such technologies do not manage to optimize adequately the relationship between reagents, reagent concentrations, temperature, time, energy use, among others.

For example, document WO/2019/193403 describes a self-catalytic chemical reduction procedure with solid-solid interaction under conditions of salt oversaturation, through the phenomenon of efflorescence to solubilize a copper metal, from a primary metallogenic ore or chalcopyrite concentrate containing it. This procedure is composed of 2 stages, called "Reductive Activation Stage" and "Dry Auto-Catalytic Reductive Transformation Stage" or Efflorescence Stage, which must be repeated between 4 to 10 cycles to obtain a percentage of copper solubilization between 75% and 80%.

On the other hand, document WO 2020/099912 describes a hydrometallurgical process with solid-liquid-solid interaction, optimized to solubilize copper from minerals and/or concentrates of primary and/or secondary sulphur minerals to a granulometry less than ½ inch (12.7 mm) at a temperature range between 20 and 35° C. to generate the selective transformation and precipitation of soluble chlorinated copper species, under conditions independent of the redox potential, achieving copper solubilization of up to 80%.

Likewise, document CL No. 1345-2010 describes a procedure for leaching primary copper ores with an average granulometry of 10.5 mm, mainly chalcopyrite to achieve the solubilization of copper sulphide, in periods of time between 150 and 250 days, in the presence of environment temperature, and depending on a redox potential between 500 and 600 mV. From this procedure, it was possible to obtain 50% of total copper extraction, the above from minerals with a granulometry average of 10.5 mm.

On the other hand, patent application CL No. 1188-2016, discloses a procedure to reduce leaching times, where calcium chloride is used to treat primary and secondary copper sulphide minerals with a particle size less than 12 mm. The procedure is performed in four stages, where a first stage consists of the addition of a recirculated solution in the agglomeration process, a second stage where heat is added to the primary sulphide ore and/or solution in the curing stage at a temperature between 30° C. and 60° C., a third stage where heat is applied to the ore or solutions in the heap leach stage at a temperature between 30° C. and 60° C., and a fourth stage where the heaps are washed with a raffinate solution. In this procedure, 46% of the total copper solubilization is obtained.

Finally, the CL document No. 1777-2017, describes a hydrometallurgical procedure to extract base and precious metals from refractory minerals, with a particle size between 2.5 and 5 cm. The procedure comprises an agglomeration stage where a solution containing solid sodium cyanide, lime and sodium chloride is used, a resting stage and a washing stage. This procedure allows the solubilization of the metals of interest, up to 70%, between 20 and 40 days. Although this procedure allows the extraction of base and precious metals from refractory minerals with a particle size between 2.5 and 5 cm, it uses sodium cyanide, which is very toxic to the environment and incompatible with traditional procedures for solubilization of copper species by an acid via and its subsequent production of copper cathodes.

Thus, even though there are several technologies that disclose different hydrometallurgical leaching conditions and procedures to improve the solubilization of metals of interest, such as copper, from ores and/or concentrates, currently there is no single procedure that is simple, eco-friendly and uses the minimum optimal quantities of reagents, and capable of optimizing copper solubilization by over 80%, from ores and/or concentrates, especially in the case of ores with a particle size larger than ½.

For this reason, it is of great importance for the mining industry to have new procedures that allow the efficient industrial optimization of the solubilization of metals of interest, either from ores and/or concentrates.

REFERENCES

WO/2019/193403. Procedure for the solubilization of primary metallogenic copper metals from ores and/or chalcopyrite concentrates containing them. NOVA MINERALIS S.A. 2018.

WO 2020/099912. Solid-liquid-solid method for solubilization of ores and copper concentrates, independent of redox potential and with low water and acid consumption. NOVA MINERALIS S.A. 2018.

CL N° 1345-2010. Procedure for leaching primary Cu ores to achieve the dissolution of copper sulphides, which includes submitting the chalcopyrite ore to a curing stage with $H_2SO_4$ and NaCl, then submitting it to a second resting stage for a time longer than 30 days and leaching it through irrigation with an aqueous solution. CORPORACIÓN NACIONAL DEL COBRE DE CHILE. 2010.

CL N° 1188-2016. Procedure for copper leaching using calcium chloride and recirculated solution in the agglomeration process cured between 30° C. and 60° C. Heap leaching at a temperature between 30° C. and 60° C. and heap washing with raffinate solution after the heap leaching process at a temperature between 30° C. and 60° C. ANTOFAGASTA MINERALS S.A. 2016.

CL N° 1777-2017. Method of base and precious metal extraction through a pre-treatment leading to the solubilization of its refractory matrices or hypexgoldest, which includes the addition of water to form a glomer whose moisture is 5-8% and a resting stage where the refractory material is transformed into a soluble salt. TECNOLOGÍAS EXPONENCIALES EN MINERALES SPA 2017.

BRIEF DESCRIPTION OF THE INVENTION

The present invention is directed to an optimized Solid-Liquid-Solid hydrometallurgical procedure, independent of redox potential, to increase the solubilization of metals from ores and/or concentrates.

The present invention consists of a Solid-Liquid-Solid hydrometallurgical procedure comprising the following stages:

a) an initial stage called "Activation", which comprises a curing and agglomeration process, which can be carried out by:

a.1) the addition of sodium chloride at a rate of between 10 kg/t and 60 kg/t, sulphuric acid at a rate of between 10 kg/t and 30 kg/t, and water or a chlorinated acid solution at a rate of between 60 kg/t and 100 kg/t, at room temperature, and reaching a final moisture of between 6% and 12%, for primary and/or secondary copper sulphide ores; or a.2) the addition of sodium chloride at a rate of between 100 kg/t and 250 kg/t, sulphuric acid at a rate of between 10 kg/t and 30 kg/t, and water or an acidic-chlorinated solution at a rate of between 60 kg/t and 120 kg/t, at room temperature, and reaching a final moisture of between 8% and 15%, for copper concentrates.

b) a second stage called "Dry auto-catalytic transformation", which comprises a process of drying and over-saturation of the chloride salts, for a time period of between 30 and 90 days in each cycle, at a temperature of between 40° C. and 60° C.

c) a third stage called "Washing and re-wetting", which involves irrigation with an acidic-chlorinated solution or industrial raffinate, using an irrigation rate of at least 5 $L/h/m^2$, and a pH between 0.1 and 5.

where the stages b) of auto-catalytic dry transformation and c) of washing and re-wetting, are repeated in an alternating, intentional and repeated way, for 3 to 8 cycles.

The stage a) of the current invention, is carried out preferably with minerals of a granulometry smaller than 40 mm, even more preferably smaller than 25 mm.

The minerals mentioned above are mixed with the chloride-acid solutions, which are prepared preferably with water and/or industrial raffinate solutions, in both cases with or without chloride ion content. More preferably, the acidic chloride solutions used in stage a) of activation are prepared with seawater or other water with a high chloride ion content. Even more preferably, in stage a.1) the minerals are mixed with chloride-acid solutions comprising seawater at a rate of 80 kg/t, sulphuric acid at a rate of 20 kg/t, and sodium chloride salts at a rate of 30 kg/t, thus reaching a final moisture content of 10%. Therefore, this stage can be designed according to the industrial needs without affecting the invention patent protection scope.

In a preferred mode of the invention, the drying and over-saturation process of stage b) is accomplished by the injection of cold or hot moist air, with a mixture of air and water steam, through the lower layers of the industrial leach heap, to enhance and accelerate drying, in a controlled manner during the drying cycles. Preferably, stage b) is performed for 45 days per cycle, and at a temperature of 50° C.

The leaching heaps used in this procedure can be permanent or dynamic (on-off), of conventional dimensions for such accumulations and according to the treatment capacities of each plant. Thus, this stage can be scaled according to the industrial needs without affecting the invention patent protection scope.

In one modality of the invention, for copper concentrates, stage c) is carried out in a stirred reactor with a solid/liquid ratio of between 1:5 and 1:10, and concluding with a filtration that allows reaching a final moisture of no more than 15%.

In a preferential mode of the invention, in stage c) a chlorine-acid raffinate solution at a concentration of between 80 and 200 gpl of chloride ion is used. More preferably, stage c) is carried out with an acidic-chlorinated raffinate solution at a temperature of between 25° C. and 60° C. Thus, this stage can be scaled according to industrial criteria without affecting the invention patent protection scope.

Additionally, the procedure of the present invention comprises the repetition of the stages b) of autocatalytic dry transformation and c) of washing and re-wetting, in an alternating, intentionally and repeated way, for 3 to 8 cycles.

Finally, the described Solid-Liquid-Solid hydrometallurgical procedure allows the solubilization of metals of interest that can be selected from the group that includes copper, zinc, nickel, molybdenum, cobalt and lead. Preferably, the invention allows the solubilization of metals from sulphide ores with arsenic contents and/or concentrates of arsenic-containing sulphide ores, which are usually considered as "refractory" to dissolution. Even more preferably, the invention allows the solubilization of metals of interest from ores and/or copper concentrates, containing chalcopyrite, enargite, bornite, covellite, chalcocite and tennantite.

BRIEF DESCRIPTION OF THE DRAWINGS

The above and other objects, features and advantages of the invention will be evident from the following more particular description of the preferred modalities of the invention, as illustrated in the attached figures.

FIG. 1 shows a table where chemical and mineralogical analyses are presented for 7 samples, which comprised 6 samples of primary and secondary sulphide minerals, and one sample of copper concentrate. The mineralogical analysis included the determination of the content of the contained copper species, such as chalcopyrite, enargite, bornite, covellite and chalcocite, through Tescan electronic microscopy, together with an identification of the contained copper via XRF. The chemical analysis involved the sequential analytical determination of acid-soluble copper ($CuS_{H+}$), cyanide soluble ($CuS_{CN-}$) and insoluble copper ($Cu_{insol}$) The reading was made using atomic absorption spectroscopy, and volumetry was used for the concentrates.

DETAILED DESCRIPTION OF THE INVENTION

Figure 2:
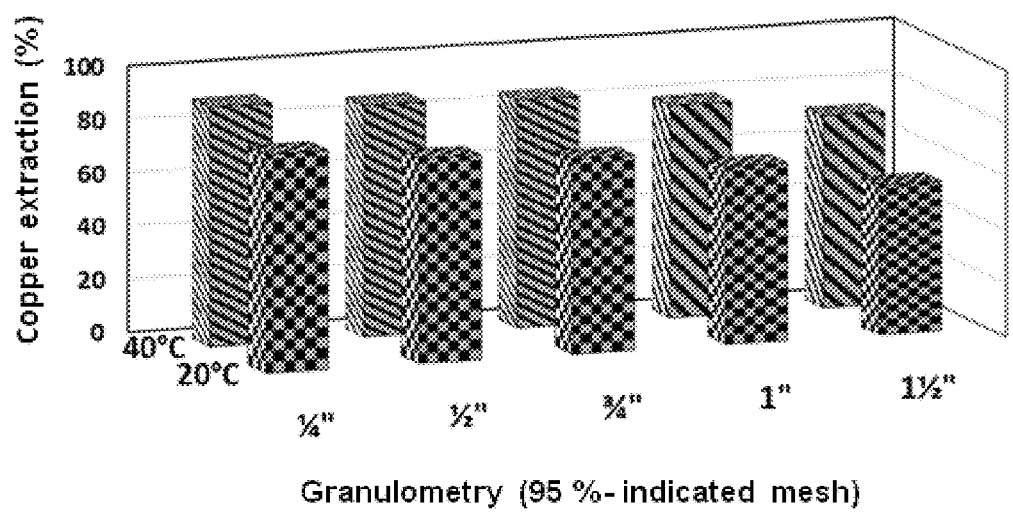
FIG. 2 shows a graph representing the percentage of copper extraction according to different granulometries, ¼", ½", ¾", 1" and 1½", of a mineral sample (M-1), in the presence of two different temperatures, at 20° C. and 40° C., during the development of the Solid-Liquid-Solid hydrometallurgical procedure.

The present invention is directed to an optimized Solid-Liquid-Solid hydrometallurgical procedure, independent of redox potential, for increasing the solubilization of metals from ores and/or sulphide ore concentrates of primary and/or secondary origin.

The present invention consists of a Solid-Liquid-Solid hydrometallurgical procedure comprising the following stages:

a) an initial stage called "Activation", which comprises a curing and agglomeration process, which can be carried out by:

a.1) the addition of sodium chloride at a rate of between 10 kg/t and 60 kg/t, sulphuric acid at a rate of between 10 kg/t and 30 kg/t, and water or a chlorinated acid solution at a rate of between 60 kg/t and 100 kg/t, at room temperature, and reaching a final moisture of between 6% and 12%, for primary and/or secondary copper sulphide ores; or a.2) the addition of sodium chloride at a rate of between 100 kg/t and 250 kg/t, sulphuric acid at a rate of between 10 kg/t and 30 kg/t, and water or an acidic-chlorinated solution at a rate of between 60 kg/t and 120 kg/t, at room temperature, and reaching a final moisture of between 8% and 15%, for copper concentrates.

b) a second stage called "Dry auto-catalytic transformation", which comprises a process of drying and oversaturation of the chloride salts, for a time period between 30 and 90 days in each cycle, at a temperature of between 40° C. and 60° C.

c) a third stage called "Washing and re-wetting", which involves irrigation with an acidic-chlorinated solution or industrial raffinate, using an irrigation rate of at least 5 L/h/m², and a pH between 0.1 and 5.

where the stages b) of auto-catalytic dry transformation and c) of washing and re-wetting, are repeated in an alternate and reiterated way, for 3 to 8 cycles.

To perform the procedure, the invention comprises a) an activation stage which is carried out preferably with ores of a granulometry less than 40 mm, ideally less than 25 mm, which can be incorporated into a homogenizing device, such as in an agglomerating drum or on a conveyor belt, in both cases to add and mix the reagents with the acid-chloride solutions which allow the curing and eventually the agglomeration of the mineral subject to the process.

Consequently, the ores and reagents are mixed with the acid-chloride solutions, which are prepared preferably with water and/or industrial raffinate solutions, in both cases with or without chloride ion content. More preferably, the acid chloride solutions used in step a) of activation can be prepared with seawater or other water with a high chloride ion content. Even more preferably, in stage a.1) the minerals are mixed with chloride-acid solutions comprising seawater at a rate of 80 kg/t, sulphuric acid at a rate of 20 kg/t, and sodium chloride salts at a rate of 30 kg/t, thus reaching a final moisture content of 10%. Hence, this stage can be scaled according to the industrial criteria without affecting the invention patent protection scope.

In this way, the invention presents great advantages concerning what is known in state of the art, one of them is related to the mineral granulometry, and the concentration of reagents used during the procedure.

Regarding granulometry, the advantage of this procedure is that it allows processing minerals at a granulometry lower than 40 mm efficiently. Indeed, it is known in the state of the art that metal solubilization increases when diminishing the minerals granulometry to be processed. The reason for this is that it increases the specific surface area and improves the accessibility for migration of the solutions inside the particles. That is, in an inversely proportional relationship. Therefore, it is evident that, by increasing the granulometry of the minerals subjected to leaching processes, the solubilization of the mineralogical species of interest decreases. On the contrary, when applying the procedure described in the present invention, the solubilization of the mineralogical species of interest remains high, even when applied to minerals of higher granulometry, for example, 40 mm. This surprising effect is because the operational conditions of the procedure have been optimized, allowing to obtain a percentage of solubilization above 75% even at a coarser granulometry, as it is the case of the 40 mm already mentioned.

Additionally, as regards the concentration of reagents used in the present invention, although they are known, the advantage provided by this procedure is that the minimum optimum concentrations of reagents are used, that is to say, low rates of sodium chloride, sulphuric acid and chloride acid solutions, achieving, despite this, a percentage of solubilization of metals of interest above 90%. Therefore, the procedure of the present invention allows to reduce the necessary resources for its execution, which supposes a surprising optimization.

Continuing with the procedure, once the minerals and/or concentrates have been moistened and agglomerated, they are transported to the leaching piles, to complete the curing process and initiate stage b) of auto-catalytic dry transformation.

In a preferential mode of the invention, stage b) of auto-catalytic dry transformation comprises the injection of cold or hot humid air, with a mixture of air and water vapour, through the base of the industrial leach heap, to enhance and accelerate the drying in a controlled manner during the drying cycles. Preferably, the injection of wet air is done with a mixture of air and water vapour, which can be applied using blowers and a system of perforated corrugated pipes, placed at different distances from the base of the pile, to generate an aeration flow against the flow of the irrigation solution. The flow of the air injection must be done in such a way that the drying does not take place abruptly. Even more preferably, the air injection flow is performed in the mineral bed in a slow and controlled manner, during the whole drying cycle, to promote and exacerbate the haloclastic and cryptoefflorescent phenomena, through the application of a humid airflow not exceeding 0.05 $Nm^3/h*t$.

At stage b) of auto-catalytic dry transformation, the drying and over-saturation of chloride salts with the ore, is carried out for a period of 30 to 90 days each cycle, at a temperature of between 40° C. and 60° C. Even more preferably, stage b) is carried out for a period of time of 45 days per cycle, and at a temperature of 50° C. The leaching heaps used in this procedure can be permanent or dynamic (on-off), of conventional dimensions for such stockpiles and according to the treatment capacities of each plant. Thus, this stage can be scaled according to industrial needs without affecting the invention patent protection scope.

At this point, it is worth mentioning that researchers have determined that the injection of humid air generates a surprising effect since it allows the promotion and exacerbation of the haloclastic and cryptoefflorescent phenomena that occur inside mineral species. In this way, by supporting the haloclastic and cryptoefflorescent phenomena, in a slow and controlled manner, at a temperature between 40° C. and 60° C., the internal rupture of the minerals is enhanced, which allows increasing the area of the exposed surface of the minerals, without the need to use finer granulometry. Thus, the leaching procedure is much simpler and more efficient than that described in state of the art.

Subsequently, and continuing with the procedure, once the drying time period is completed, we proceed with the stage c) of washing and re-wetting, where all the solubilized copper is removed, with an intensive irrigation and at a rate consistent with the granulometry of the minerals stacked and the height of the leaching heap.

Preferably, stage c) of washing and re-wetting is carried out with an acid-chlorinated raffinate solution at a concentration of between 80 and 200 gpl of chloride ion. More preferably, stage c) is carried out with an acidic-chlorinated raffinate solution at a temperature of between 25° C. and 60° C. In this way, heat losses from the system are avoided, and it is possible to preserve the thermal conditions for the start of the next cycle which begins with a new stage b) of auto-catalytic dry transformation, followed by a new stage c) of washing and re-wetting. Thus, this stage can be designed according to industrial criteria without affecting the invention patent protection scope.

In an alternative mode, stage c) of washing and re-wetting for copper concentrates, is carried out in a stirred reactor, in a solid/liquid ratio of between 1:5 and 1:10, taking into account the large amount of copper present. The required solid/liquid separation after washing must be carried out using a filter press or similar device, which leaves the filtrate residue at a moisture of no more than 15%. Therefore, the start of the new resting cycle is optimized.

Additionally, the procedure includes the repetition of the stages b) of autocatalytic dry transformation and c) of washing and re-wetting, in an alternating, intentional and repeated way, for 3 to 8 cycles. Thus, this stage can be designed according to industrial criteria without affecting the invention patent protection scope.

Although it is known that by repeating the leaching stages it is possible to increase the solubilization of metals of interest, it is not evident to achieve the best conditions to carry out this procedure, much less to treat different types of mineralogical species, using the same procedure. In this sense, the adjustment of the operational parameters play an important role, since this stage must consider the type of mineralogical species, the time and conditions of washing, the percentage of final moisture, etc.

Thereby, the researchers have been able to demonstrate that the repetition of the stages b) auto-catalytic dry transformation and c) washing and re-wetting, in an alternating, intentional and repeated manner, during 3 to 8 cycles, under the conditions previously described, allows increasing the solubilization of the metals of interest by over 80%, either for primary and/or secondary sulphide ores or concentrates of the same.

Finally, the Solid-Liquid-Solid hydrometallurgical procedure allows the solubilization of metals of interest that can be selected from the group that includes copper, zinc, nickel, molybdenum, cobalt and lead. Preferably, the invention permits the solubilization of metals from arsenic-containing sulphide ores and/or arsenic-containing sulphide ore concentrates, which are usually considered as "refractory" to dissolution. Even more preferably, the invention permits the solubilization of metals from copper ores and/or concentrates, containing chalcopyrite, enargite, bornite, covellite, chalcocite and tennantite.

The invention will be better understood through the following examples, which are merely illustrative and not limiting the scope of the invention. Several changes and modifications to the described modalities will be evident to the experts in the field, and such changes can be made without departing from the spirit of the invention and the protection scope of the attached claims.

EXAMPLES

Example No. 1

Chemical and Mineralogical Analysis of Copper Sulfide Ores and Concentrates, of Primary and Secondary Origin In order to optimize the solubilization of metals of interest from minerals and/or copper sulphide ore concentrates, of primary and secondary origin, the composition of six ore samples and one concentrate sample was first analysed, as shown in FIG. 1.

To carry out these mineralogical analyses, Tescan electron microscopy was used, along with an identification of the copper contained via XRF. Sequential chemical analyses considered attacks with sulphuric acid, cyanide and triple acids, for the sequential determination of acid-soluble copper, cyanide soluble and insoluble copper. The reading was made using atomic absorption spectroscopy, and in the case of the concentrates, mainly volumetry was used.

According to the results, it was observed that the copper contained in the mineral sample M-2 is 98.7% in the form of chalcopyrite, placing this sample as the most refractory of the samples analysed in the present invention. On the other hand, the M-6 sample corresponds to the weakest one, since only 11.7% of copper is present in the chalcopyrite form and, therefore, it shows a minor difficulty to extract copper from that mineral. Likewise, it was determined that for the concentrate, 73% of the copper was in the chalcopyrite form, and 17% in the bornite form.

Example No. 2

Effect of Granulometry and Temperature During the Solid-Liquid-Solid Hydrometallurgical Procedure In order to determine the effect of the granulometry of the ore and the temperature to optimize the Solid-Liquid-Solid hydrometallurgical procedure, five micro-column leaching tests were performed with five samples of the M-1 ore analysed in FIG. 1. Each of the M-1 ore samples represents the different maximum sizes of the ore, which were ¼", ½", ¾", 1 " and 1½".

All tests were carried out in columns 30 cm high and 5" in diameter, considering an acidic-chlorinated solution comprising seawater, sulphuric acid at a rate of 20 kg/t, and sodium chloride salts at a rate of 30 kg/t, and a final moisture of 10%. Each test was carried out using 7 cycles, where each cycle corresponds to a stage b) of auto-catalytic dry transformation and a stage c) of washing and re-wetting with an acid chloride raffinate solution at a concentration of 120 gpl of chloride ion, leaving a resting period of 30 days between each cycle.

To analyse the effect of temperature, each of the tests above mentioned was performed at two different temperatures, one at 20° C. and another at 40° C., as shown in FIG. 2.

Additionally, it is recommended that for determining the appropriate granulometry to develop the process, an economic evaluation be made that considers the marginal operating and investment cost of reducing the size of the ore versus the marginal benefit of increased copper extraction resulting from such size reduction. This balance must also consider the number of on-off rinsing cycles required to reach the optimum and the time needed for that purpose, which implies having a leach pad of a size consistent with the time necessary to keep the ore stacked during an additional on-off rinsing cycle.

From the results obtained, it was determined that the procedure developed allowed the solubilization of copper in all granulometries tested, reaching a percentage of copper solubilization between 60% and 85%.

Therefore, the researchers determined that the conditions tested allowed solubilizing copper from minerals with different granulometries.

Example No. 3

Figure 3:
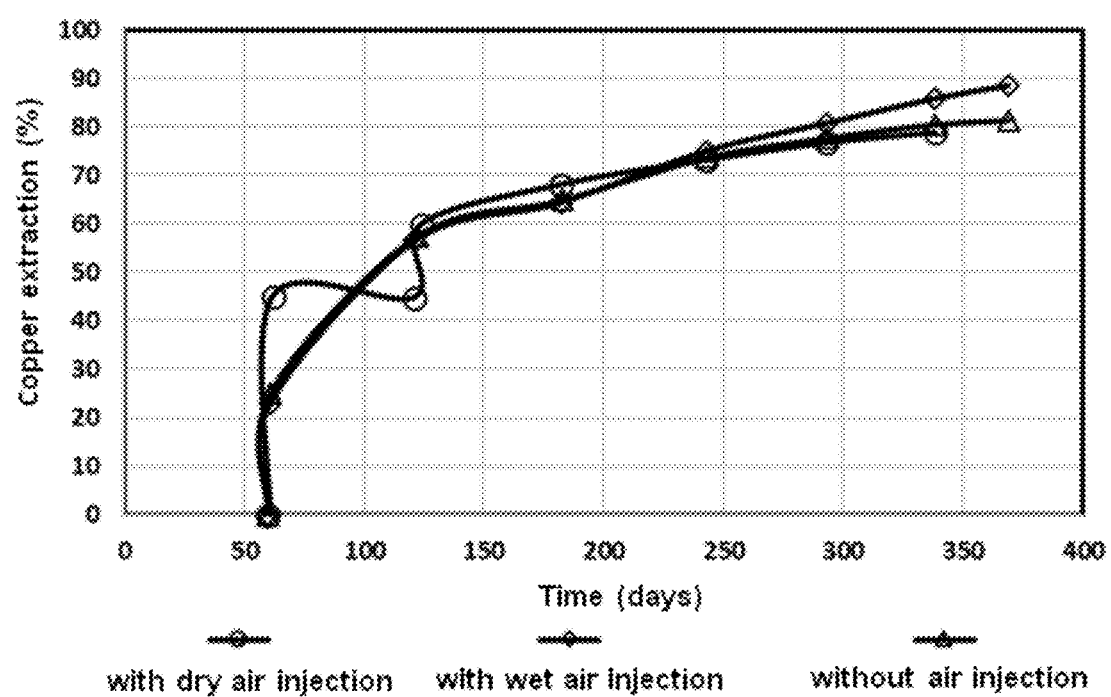
FIG. 3 shows a graph representing the percentage of copper extraction as a function of the duration of the Solid-Liquid-Solid hydrometallurgical procedure. The procedure was performed using a mineral sample (M-1), in the presence of three drying conditions in each cycle, with dry air injection, with wet air injection and without any air injection. The procedure was carried out with a total of seven cycles, at a constant temperature of 35° C., and a resting period of 30 days between each cycle.

Effect of Controlled Drying With Air and Water Steam During the Solid-LIquid-Solid Hydrometallurgical Process In order to determine the effect of controlled drying to optimize the Solid-Liquid-Solid hydrometallurgical process, tests were carried out using different techniques of controlled drying of the ore bed, as shown in FIG. 3.

Then, stage b) of auto-catalytic dry transformation was carried out during a period of 60 days, where three different conditions of heat application at a temperature of 40° C. were evaluated. The conditions analysed were: injection of dry, hot air, injection of moist air (i.e. hot air with water steam), and direct heat application without any airflow (i.e. through a jacketed leaching column with a heated blanket).

Subsequently, stage c) of washing and re-wetting was carried out, using an acidic-chlorinated raffinate solution at a concentration of between 120 gpl of chloride ion, leaving a resting period of 30 days between each cycle.

Finally, the stages b) of auto-catalytic dry transformation and c) of washing and re-wetting, were repeated in an alternating, intentional and repeated manner, during seven cycles, with a resting period of 30 days for each cycle.

From the obtained results, it was determined that the injection of dry air generates a harmful effect on the solubilization of the metal of interest by reaching too quickly the absolute dryness, as shown in FIG. 3, having as a consequence the halting of the reaction. On the other hand, by injecting wet air into the ore bed, it is possible to keep the reactions of interest active until all the available reagents are used in each cycle, thus achieving solubilization of the metal of interest that is very close to 90% in fewer cycles.

These results show that the optimization of the operational conditions of the process is fundamental to achieve better percentages of solubilization of the metal to be extracted.

Example No. 4

Figure 4:
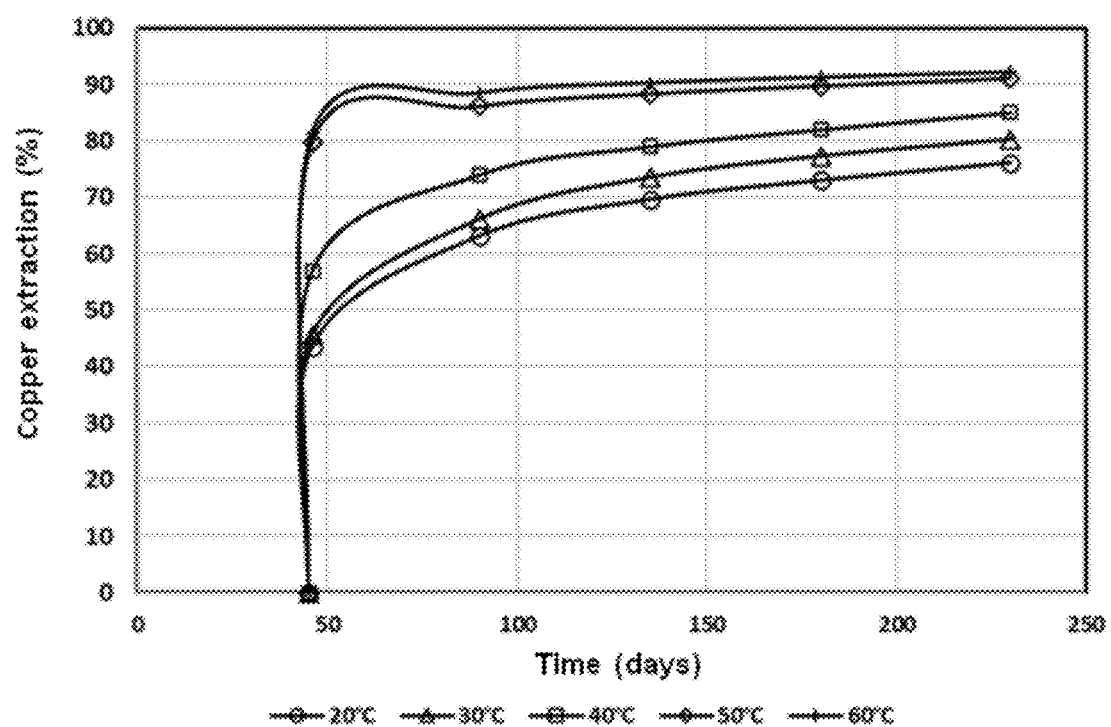
FIG. 4 shows a graph showing the percentage of copper extraction as a function of the duration of the Solid-Liquid-Solid hydrometallurgical process, in the presence of different temperatures, 20° C., 30° C., 40° C., 50° C. and 60° C. The procedure was carried out using the M-1 mineral sample. The process was carried out with a total of five cycles and a resting period of 45 days between each cycle.

Effect of Temperature in the Dry Autocatalytic Transformation Stage, During the Solid-Liquid-Solid Hydrometallurgical Procedure In order to determine the effect of temperature during stage b) controlled dry auto-catalytic transformation to optimize the Solid-Liquid-Solid hydrometallurgical process, tests were carried out where different temperatures were used, namely 20° C., 30° C., 40° C., 50° C. and 60 ° C. respectively, as shown in FIG. 4.

To carry out this analysis, 5 leaching tests were performed on micro-columns using minerals from the M-1 sample.

In the Solid-Liquid-Solid hydrometallurgical procedure, step b) of activation was carried out using an acid-chloride solution containing seawater, sulphuric acid at a rate of 20 kg/t, and sodium chloride salts at a rate of 30 kg/t, and a final moisture of 10%.

Then, the stage b) of auto-catalytic dry transformation was carried out, where different temperatures were evaluated, 20° C., 30° C., 40° C., 50° C. and 60° C.

Subsequently, stage c) of washing and re-wetting was carried out, using an acidic-chlorinated raffinate solution at a concentration of between 120 gpl of chloride ion.

Finally, the stages b) of autocatalytic dry transformation and c) of washing and re-wetting, were repeated in an alternating, intentional and repeated way, during seven cycles, with a resting period of 45 days for each cycle.

As can be seen in FIG. 4, the effect of the temperature applied during stage b) of autocatalytic dry transformation generates surprising differences during the solubilization of the metal. For example, when comparing in the first cycle, the percentage of copper solubilization at a temperature of 20° C. is 45%; in contrast, at a temperature of 50° C. to 60° C., it is 80%. Additionally, it can be seen that by performing 2 to 5 cycles, it is possible to increase this percentage of solubilization to 90%. Instead, by applying temperatures between 20° C. and 40° C., it is only possible to achieve a solubilization percentage of 85% in the fifth cycle. A decrease in the number of cycles implies a lower total operating time and the areas required for the plant decrease, which constitutes a substantial economical savings. Likewise, a lower number of cycles also facilitate the operation of an industrial plant due to the simplification of the processes involved.

Therefore, based on the obtained results, it was determined that the optimum temperature during the stage b) of autocatalytic dry transformation is 50° C., as it allows increasing copper solubilization to 90%, without requiring more than 3 washing/rewetting cycles to achieve this objective.

Example No. 5

Figure 5:
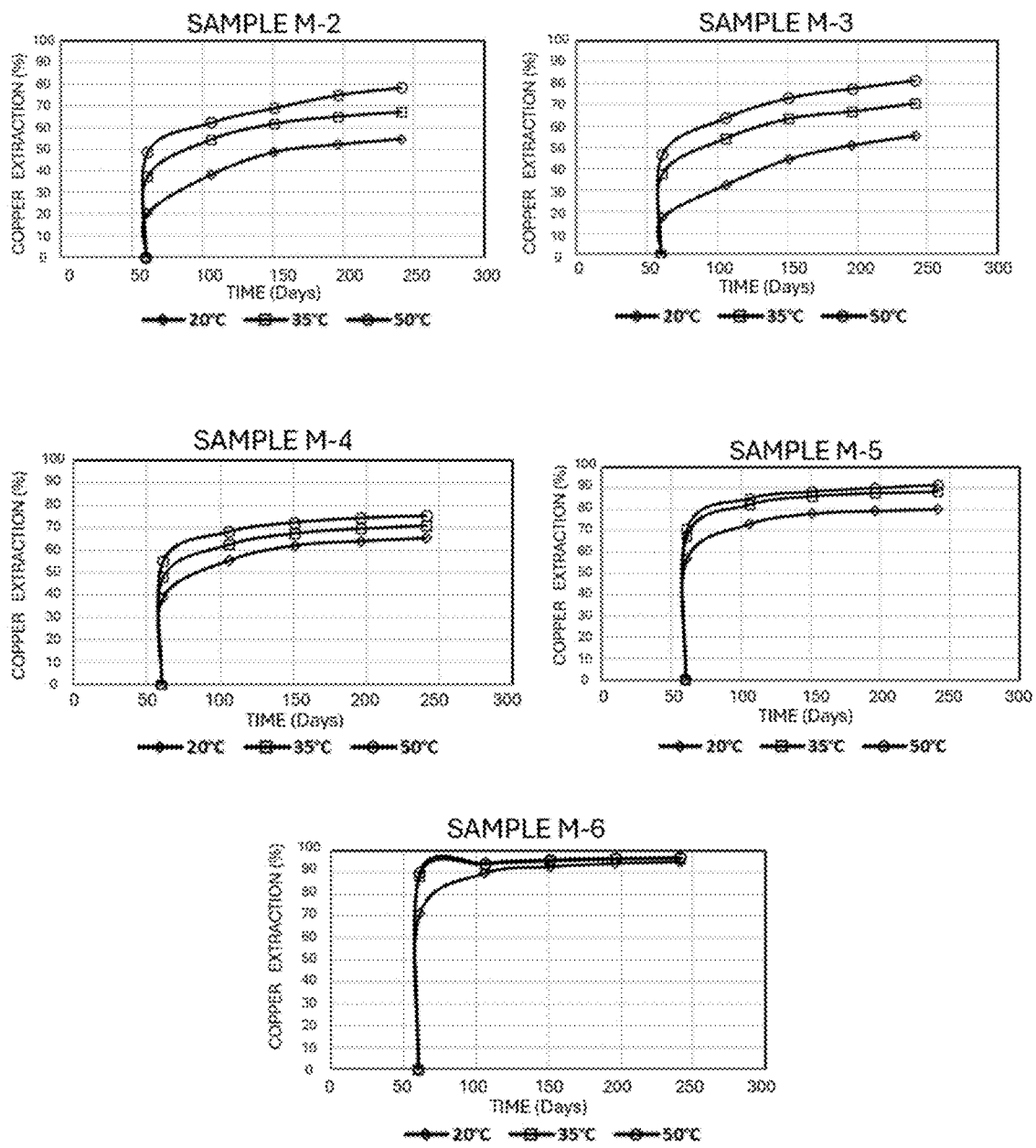
FIG. 5 shows five graphs representing the percentage of copper extraction as a function of the duration of the Solid-Liquid-Solid hydrometallurgical process, in the presence of different temperatures, 20° C., 35° C. and 50° C., for different compositions of primary and secondary sulphide copper ores. The different compositions of the analysed minerals correspond to those detailed in FIG. 1. Each performed tests were carried out in a total of five cycles and a resting period of 45 days between each cycle.

Temperature Effect on Different Mineralogical Compositions During the Solid-Liquid-Solid Hydrometallurgical Process In order to determine the effect of temperature on different mineralogical compositions, to optimize the Solid-Liquid-Solid hydrometallurgical process, three different temperatures were evaluated, namely 20° C., 35° C. and 50° C., for each of the other mineral compositions analysed, as shown in FIG. 5.

The different mineral compositions analysed correspond to the different species of primary and secondary copper sulphides, from the most refractory (chalcopyrite) to the weakest (chalcocite), as shown in FIG. 1.

In the Solid-Liquid-Solid hydrometallurgical procedure, the activation stage (a) was carried out using an acid chloride solution containing seawater, sulphuric acid at a rate of 20 kg/t, and sodium chloride salts at a rate of 30 kg/t, and a final moisture of 10%.

Then, a cycle was carried out where stage b) of autocatalytic dry transformation, was evaluated in the presence of three different temperatures, namely 20° C., 35° C. and 50° C.

Then, stage c) of washing and re-wetting, was carried out using an acid-chloride raffinate solution at room temperature at a concentration of between 120 gpl of chloride ion, leaving a resting period of 45 days between each cycle.

Finally, the stages b) of autocatalytic dry transformation and c) of washing and re-wetting, were repeated in an alternating, intentional and repeated way, during five cycles, with a rest period of 45 days for each cycle.

Based on the obtained results, it can be seen that the optimum temperature during the stage b) of dry autocatalytic transformation is 50° C., allowing the solubilization of copper from different mineral samples to be increased, where copper can be in its most refractory form (chalcopyrite) with 98.7% (M-2) or in a less refractory fashion (chalcocite) with only 11.7% in the form of chalcopyrite (M-6), and achieve faster copper solubilization percentages of between 75% and 98%, depending on the mineral species being treated.

Thus, the optimization of the operational parameters of the Solid-Liquid-Solid hydrometallurgical process makes it possible to achieve copper solubilization of between 75 and 98%, regardless of the type of mineralogical species involved.

The optimization of this procedure represents a significant advantage over what is described in the state of the art, since other technologies are only capable of solubilising copper in its most refractory form by 70%. On the other hand, this simple optimized procedure allows the solubilization of copper from 75% upwards, independent of the mineralogical composition of the minerals to be treated.

Example No. 6

Figure 6:
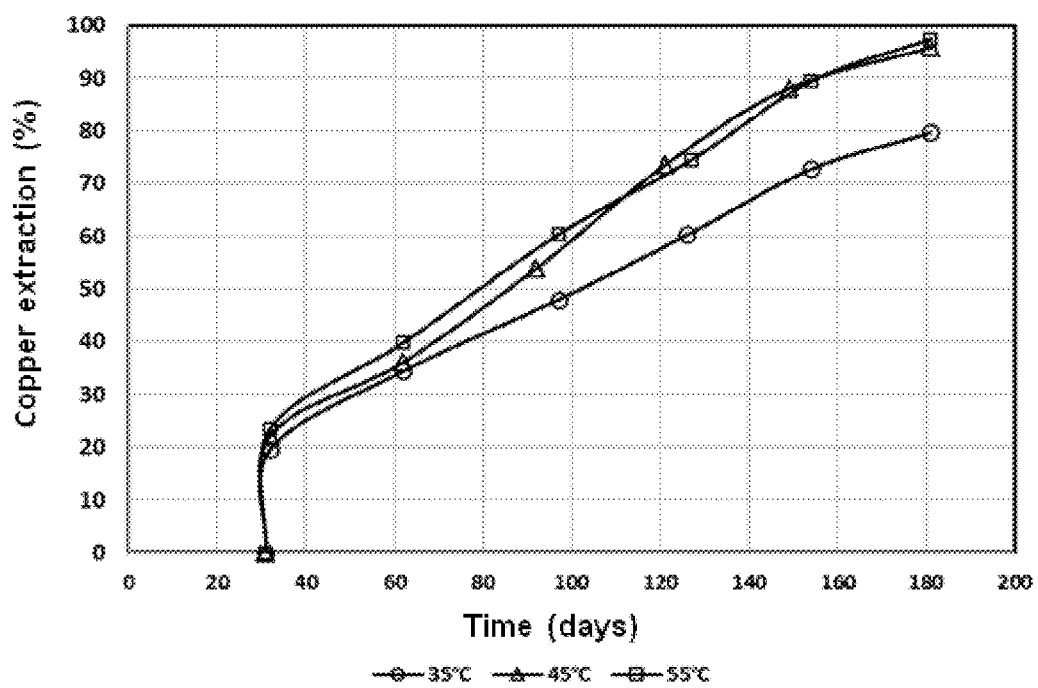
FIG. 6 shows a graph representing the percentage of copper extraction as a function of the duration of the Solid-Liquid-Solid hydrometallurgical procedure, in the presence of different temperatures, 35° C., 45° C. and 55° C., for a sample of copper concentrate ore. The test was performed with a total of six cycles and with a 30 day resting period between each cycle.

Temperature Effect on Copper Concentrates During the Solid-Liquid-Solid Hydrometallurgical Process In order to determine the temperature effect on copper concentrates, to optimize the Solid-Liquid-Solid hydrometallurgical process, three different temperatures were evaluated, 35° C., 45° C. and 55° C., using a copper concentrate sample, as shown in FIG. 6.

During the Solid-Liquid-Solid hydrometallurgical procedure, the stage a) of activation, was carried out using an acid-chloride solution containing seawater at a rate of 120 kg/t, sulphuric acid at a rate of 30 kg/t, and sodium chloride salts at a rate of 200 kg/t, and a final moisture of 15%.

Then, a cycle was carried out where stage b) of autocatalytic dry transformation, was evaluated in the presence of three different temperatures, 35° C., 45° C. and 55° C.

Subsequently, stage c) of washing and re-wetting, was carried out using a chloride-acid raffinate solution at a concentration of 180 gpl of chloride ion in a stirred leaching tank using a solid:liquid ratio of 1:5 for a period of 1 hr. The pulp was then filtered to final moisture content of 15%.

Finally, the stages b) of autocatalytic dry transformation and c) of washing and re-wetting were repeated in an alternating, intentional and repeated way, during six cycles, with a resting period of 30 days for each cycle.

The results achieved after 5 cycles of irrigation/rest were the levels of copper extraction, for each of the temperatures analysed, as shown in FIG. 6.

Based on the results obtained, it can be seen that copper concentrates require between 4 and 6 cycles to reach a solubilization of between 75% to 98 at a temperature of between 45° C. and 55° C., regardless of their mineralogical nature. Thus, and considering that there is no significant difference in the solubilization of copper in the presence of a temperature of between 45° C. and 55° C., it was determined that the optimum temperature is 50° C. to maintain the same operational conditions as those used for all sulphide minerals.

This demonstrates the great advantage of the Solid-Liquid-Solid hydrometallurgical process of the present invention, as it allows the processing of ores and concentrates using the same operational parameters to achieve copper solubilization of more than 75%.

The invention claimed is:

1. A Solid-Liquid-Solid hydrometallurgical procedure, optimized and independent of redox potential, to increase the solubilization of metals from ores and/or concentrates, wherein this procedure comprises the following stages:
   a) an initial stage called "Activation", comprising a curing and agglomeration process, which is carried out by:
      a.1) the addition of sodium chloride at a rate of between 10 kg/t and 60 kg/t, sulfuric acid at a rate of between 10 kg/t and 30 kg/t, and water or an acid-chloride solution at a rate of between 60 kg/t and 100 kg/t, at room temperature, and achieving a final moisture of between 6% and 12%, for primary and/or secondary copper sulfide ores; or
      a.2) the addition of sodium chloride at a rate of between 100 kg/t and 250 kg/t, sulfuric acid at a rate of between 10 kg/t and 30 kg/t, and water or an acid-chloride solution at a rate of between 60 kg/t and 120 kg/t, at room temperature, and reaching a final moisture of between 8% and 15%, for copper concentrates;
   b) a second stage called "Autocatalytic Dry Transformation", which comprises a process of drying and oversaturation of chloride salts, for a time of between 30 and 90 days in each cycle, at a temperature of between 40° C. and 60° C.;
   c) a third stage called "Washing and re-Wetting", which involves irrigation with an acid-chloride solution or industrial raffinate, using an irrigation rate of at least 5 L/h/m$^2$, and a pH of between 0.1 and 5;
where the stages b) of auto-catalytic dry transformation and c) of washing and re-wetting, are repeated in an alternate and repeated way, for 3 to 8 cycles.

2. The procedure in accordance with claim 1, wherein the procedure is carried out with minerals at a granulometry of less than 40 mm.

3. The procedure according to claim 1, wherein the procedure is done with minerals with a granulometry lower than 25 mm.

4. The procedure according to claim 1, wherein the acid-chloride solution from step a.1), a.2), and/or c) is prepared with water and/or industrial raffinate solutions, both with chloride ion contents.

5. The procedure according to claim 4, wherein the acid-chloride solution from step a.1), a.2), and/or c) comprises seawater.

6. The procedure according to claim 5, wherein in step a.1), the acid-chloride solution comprises seawater at a rate of 80 kg/t.

7. The procedure according to claim 1, wherein in stage a.1), the sulfuric acid is added at a rate of 20 kg/t.

8. The procedure according to claim 1, wherein in stage a.1), an addition of chloride ion is through sodium chloride salts added at a rate of 30 kg/t.

9. The procedure according to claim 1, wherein in stage a.1), a final moisture of 10% is reached.

10. The procedure according to claim 1, wherein stage b), comprises the injection of cold or hot wet air, from a mixture of air and water steam, through the lower layers of the industrial leaching heap, to enhance and accelerate drying during the drying cycles.

11. The procedure according to claim 1, wherein in stage b), the drying is carried out for a time of 45 days per cycle.

12. The procedure according to claim 1, wherein in stage b), the drying is carried out at a temperature of 50° C.

13. The procedure according to claim 1, wherein in stage c), for copper concentrates is carried out in a stirred reactor with a solid/liquid ratio of between 1:5 and 1:10, and concluding with a filtration that allows a final moisture of no more than 15% to be reached.

14. The procedure according to claim 1, wherein in stage c), the acid-choride solution or industrial raffinate is at a concentration of between 80 and 200 g/l of chloride ion.

15. The procedure according to claim 14, wherein in stage c), the acid-choride solution or industrial raffinate is at a temperature above 25° C.

16. The procedure according to claim 1, wherein the metals to be solubilized during step b) are selected from the group that includes copper, zinc, nickel, molybdenum, cobalt, and lead.

17. The procedure according to claim 1, wherein the solubilization of metals to be solubilized during step b) is carried out from sulfide ores with arsenical contents and/or arsenical sulfide ore concentrates containing the metals to be solubilized.

18. The procedure according to claim 1, wherein the solubilization of the metals to be solubilized in step b) is carried out from minerals and/or copper concentrates, which contain chalcopyrite, enargite, bornite, covellite, chalcocite, and tennantite.

* * * * *